United States Patent [19]
Nickel

[11] Patent Number: 4,750,718
[45] Date of Patent: Jun. 14, 1988

[54] DUAL RATE LEAF SPRING CONSTRUCTION

[75] Inventor: Herbert W. Nickel, Germantown, Wis.

[73] Assignee: A. O. Smith Corporation, Milwaukee, Wis.

[21] Appl. No.: 75,232

[22] Filed: Jul. 17, 1987

Related U.S. Application Data

[63] Continuation of Ser. No. 772,844, Sep. 5, 1985, abandoned.

[51] Int. Cl.⁴ ............................................... F16F 1/26
[52] U.S. Cl. ...................................... 267/49; 267/149
[58] Field of Search ........................ 267/30, 47, 48, 49, 267/50, 52, 148, 149

[56] References Cited

U.S. PATENT DOCUMENTS

| | | | |
|---|---|---|---|
| 2,861,798 | 11/1958 | Lenet et al. | 267/48 X |
| 3,061,301 | 10/1962 | Bajer et al. | 267/52 |
| 3,541,605 | 11/1970 | Möhl | 267/47 |
| 3,586,307 | 6/1971 | Brownyer | 267/49 X |
| 3,968,958 | 7/1976 | Huchette et al. | 267/149 X |

FOREIGN PATENT DOCUMENTS 727481 4/1980 U.S.S.R. ................................ 267/48

Primary Examiner—Duane A. Reger
Attorney, Agent, or Firm—Andrus, Sceales, Starke & Sawall

[57] ABSTRACT

A dual rate leaf spring construction including a main leaf spring, preferably formed of fiber reinforced resin, and having a central section adapted to be connected to an axle of a vehicle and having a pair of ends to be connected to the frame of the vehicle. A secondary leaf spring, having a substantially shorter length than the main leaf spring, is secured beneath and parallel to the main leaf spring, and an elastomeric pad is mounted on each end of the secondary spring. The pads have upwardly facing rounded heads that are spaced out of contact with the lower surface of the main spring under normal load conditions. Under heavy load conditions, the main spring will deflect downwardly into contact with the pads to thereby enable the secondary spring to carry a portion of the load.

5 Claims, 1 Drawing Sheet

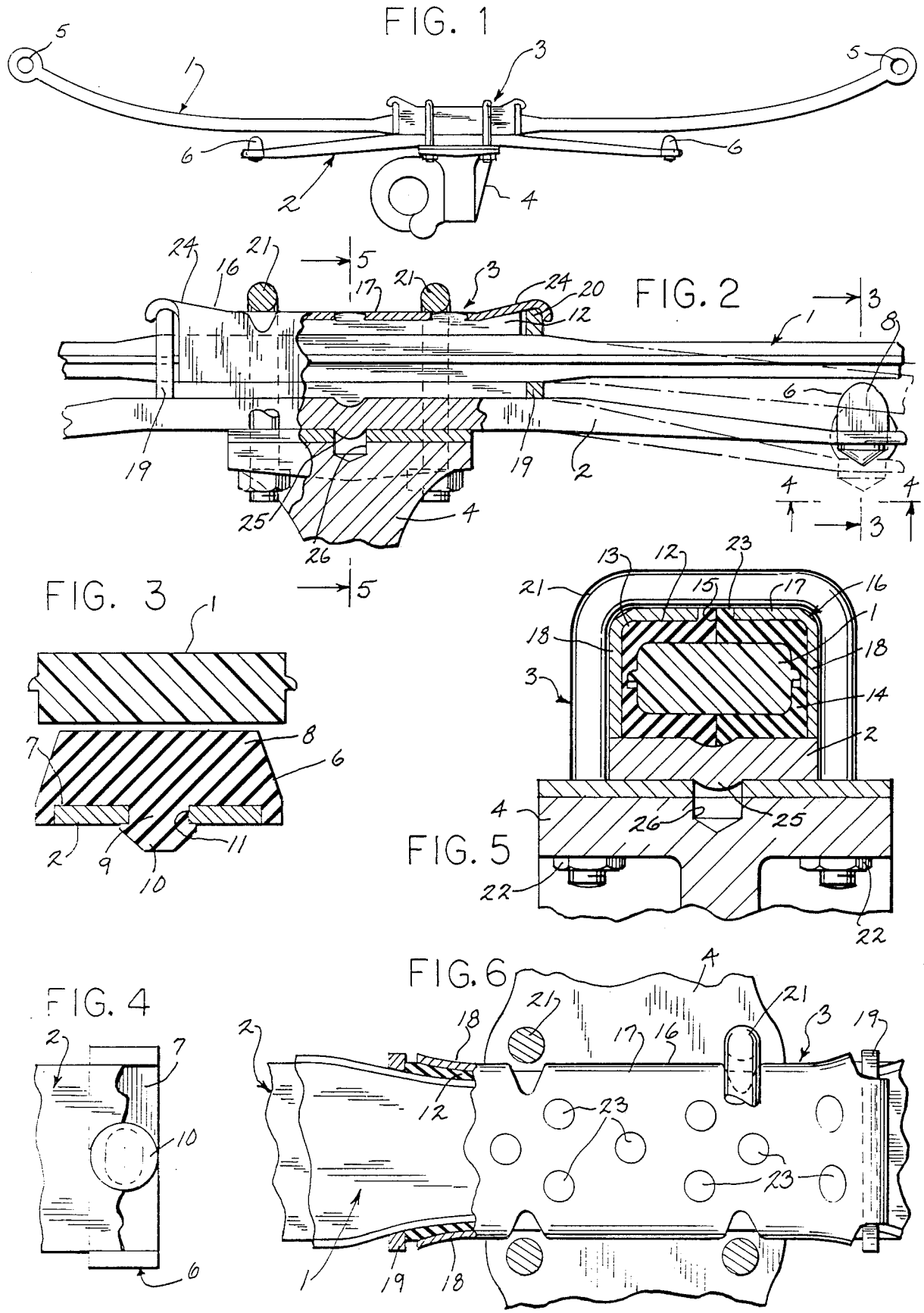

DUAL RATE LEAF SPRING CONSTRUCTION

This is a continuation of application Ser. No. 06/772,844, filed Sept. 5, 1985, now abandoned.

BACKGROUND OF THE INVENTION

With certain types of vehicles, it is desirable to have a dual or variable rate leaf spring construction. For example with light trucks, it is desirable to have a soft ride under normal driving conditions, but the spring should also have the capability of carrying heavy loads. To obtain a variable spring rate, multiple steel leaves have been used which incorporate leaves of decreasing lengths. The main leaf will carry the load under normal driving conditions, but when a heavy load is encountered, the main leaf will deflect downwardly into contact with the secondary leaves to increase the spring rate to the designed level.

Recently there has been substantial activity in the development of fiber reinforced resin leaf springs due to the fact that they have a substantially lesser weight than conventional steel leaf springs. However, it is extremely important to eliminate stress concentrations in the fiber reinforced resin spring. Any sharp point of contact can cause a stress concentration which can result in premature failure. In view of this, there has been a need for a dual rate, fiber reinforced resin spring which will prevent any undue stress concentration in the main spring under heavy load conditions.

SUMMARY OF THE INVENTION

The invention is directed to a dual rate leaf spring construction having particular application of use with a fiber reinforced resin leaf spring. In accordance with the invention, the leaf spring construction comprises a main leaf, preferably formed of fiber reinforced thermosetting resin, and having a central section adapted to be connected to an axle mounting bracket. The ends of the main spring are formed with bushings that are adapted to receive fasteners to connect the ends of the main spring to the frame of the vehicle.

A secondary leaf spring, formed of steel or fiber reinforced resin, is secured beneath and parallel to the main spring. The secondary spring has a substantially shorter length than the main spring and is therefore less flexible. Mounted on each end of the secondary spring is an elastomeric pad having an upwardly extending rounded head that is spaced out of contact with the lower surface of the main spring under normal load conditions.

When a predetermined heavy load is applied to the main leaf spring, the main spring will be deflected downwardly into engagement with the pad thereby increasing the spring rate. This allows the vehicle to accept greater loads without bottoming out.

The elastomeric pads are configured to be self-cleaning to prevent any accumulation of foreign material, such as mud, stones and the like, between the upper surface of the pad and the main leaf spring which could cause areas of stress concentration.

The pads are molded from an elastomeric material and can be attached to the secondary spring by bonding, or in the case of a steel secondary spring, can be press fitted into openings in the secondary spring, or attached to the spring by auxiliary fasteners, molded in studs, adhesive bonding, or combinations thereof.

Other objects and advantages will appear in the course of the following description.

DESCRIPTION OF THE DRAWINGS

The drawings illustrate the best mode presently contemplated of carrying out the invention.

In the drawings:

FIG. 1 is a side elevation of the dual rate spring of the invention as attached to an axle mounting bracket of a vehicle, with the main leaf spring shown under normal load conditions;

FIG. 2 is an enlarged fragmentary side elevation showing the main spring and secondary spring with the normal load condition shown in full lines and the heavy load condition shown in phantom lines;

FIG. 3 is a section taken along line 3—3 of FIG. 2; and

FIG. 4 is a fragmentary bottom view of an end of the secondary spring;

FIG. 5 is a section taken along line 5—5 of FIG. 2; and

FIG. 6 is an enlarged fragmentary plan view with parts broken away showing the attachment of the spring assembly to the axle mounting bracket.

DESCRIPTION OF THE ILLUSTRATED EMBODIMENT

The drawings showing a dual rate spring construction including a main leaf spring 1 and a secondary leaf spring 2 which are connected by clamping mechanism 3 to an axle mounting bracket 4.

As illustrated in FIG. 1, the end portions of main leaf spring 1 are curved upwardly and the ends are provided with bushings 5 that receive fasteners to connect the ends of spring 1 to the frame of a vehicle.

Spring 1 is preferably formed of fiber reinforced thermosetting resin in which the fibers, such as glass fibers, extend continuously throughout the length of spring 1 and around the bushings 5. The thermosetting resin can take the form of an epoxide or polyester resin.

As illustrated, secondary spring 2 is formed of a metal such as steel, but alternately it can be fabricated from fiber reinforced resin. As shown in FIG. 1, the secondary spring is curved downwardly and has a substantially shorter length than main spring 1. thereby resulting in secondary spring 2 being less flexible than main spring 1. In general, secondary spring 2 has a length in the range of 0.25 to 0.75 of the length of main spring 1.

In accordance with the invention, elastomeric pads 6 are mounted on the ends of secondary spring 2 and project upwardly toward the main spring 1. Under normal load conditions, the upper extremity of pads 6 will be spaced out of contact with the lower surface of main spring 1, as illustrated in FIG. 1. Pads 6 are formed of a resilient elastomeric material and it has been found that the polyester elastomer Hytrel sold by E. I. DuPont de Nemours & Company, is a suitable material for the pads 6.

As best illustrated in FIG. 3, the lower surface of each pad is provided with a recess 7 that receives the respective end of secondary spring 2 and the upper portion of each pad defines a head 8 which has a rounded or dome-like configuration in vertical cross section, as best shown in FIGS. 1 and 2.

To attach the pad 6 to the secondary spring 2, each pad is provided with a neck portion 9 of reduced diameter and a lower enlarged button 10. Button 10 can be deformed and pushed through a hole 11 in spring 2 and will snap into position against the lower surface of spring 2 to hold the pad 6 to the spring.

The clamping mechanism 3 for mounting the springs 1 and 2 to axle mount bracket 4 is best illustrated in FIGS. 2, 5 and 6. As shown in FIG. 5 an elastomeric or resilient jacket 12 surrounds the central portion of main spring 1. Jacket 12 can be molded in two generally U-shaped halves 13 and 14 which abut along the line 15. A channel-shaped member 16 is positioned over jacket 12 and the channel member consists of a web portion 17 and a pair of side flanges 18. In addition, end members 19 are engaged with grooves 20 in the ends of web 17 and enclose the ends of the elastomeric jacket 12. End members 19 are provided with openings through which springs 1 and 2 extend.

A pair of U-bolts 21 extend over the channel member 16 and serve to connect the springs 1 and 2 to the axle mounting bracket 4. In this regard, the ends of the U-bolt 21 extend through holes in the bracket 4 and rceive nuts 22.

The elastomeric jacket 12 which surrounds the spring 1 prevents stress concentrations from arising in the clamping area of spring 1, and the engagement of the side flanges 18 with the secondary spring 2, as the nuts 22 are threaded down, limits compression of the jacket 12.

As best illustrated in FIG. 6, the web portion of channel member 16 is provided with a plurality of holes 23 and as the elastomeric jacket 12 is compressed, the elastomeric material will flow into the holes to provide a mechanical lock that will resist axial movement between the main spring 1 and clamping mechanism 3.

As shown in FIG. 2, the ends of channel member 16 are flared upwardly at 24 to provide an increased thickness of the elastomeric jacket 12 at the ends of the clamping mechanism to further prevent stress concentrations at this location.

To aid in preventing longitudinal slippage between spring 2 and bracket 4, the spring can be formed with a downwardly extending projection 25 that is received in a hole 26 in bracket 4, as illustrated in FIG. 2.

Under normal load conditions, the heads 8 of pad 6 are out of contact with the main spring 1. However, when a heavy load is encountered, the main spring will deflect downwardly into contact with the pads 6 and the heads 8 will deform as shown in FIG. 2. Continued deflection of the main spring will then cause downward deflection of the secondary spring 2 to achieve the dual rate. The elastomeric pads 6 act to distribute the load to prevent stress concentrations in the fiber reinforced resin material of spring 1 during heavy load conditions.

The rounded upper portion of heads 8 are designed to be self-cleaning and prevent any accumulation of foreign material, such as mud, stones, and the like, between the upper surface of the head and the main spring 1 which could result in stress concentrations.

While the drawings have shown the pad 6 being attached to the secondary spring 2 through use of the snap fitting buttons 10, it is contemplated that in the case of a fiber reinforced resin secondary spring, the pads can be bonded to the upper surface of the secondary spring, or when using a steel secondary spring, the pads could be attached to the spring through auxiliary fasteners, such as rivets.

Various modes of carrying out the invention are contemplated as being within the scope of the following claims particularly pointing out and distinctly claiming the subject matter which is regarded as the invention.

I claim:

1. A dual rate leaf spring construction, comprising a main leaf spring composed of fiber reinforced thermosetting resin having a central section disposed to be connected to an axle of a vehicle and having a pair of ends disposed to be connected to a frame of said vehicle, a secondary leaf spring disposed beneath the main leaf spring and having a length from 0.25 to 0.75 times the length of the main leaf spring, an elastomeric pad mounted on each end of the secondary leaf spring and having an upwardly extending head, said head having a generally rounded configuration in vertical cross section and each head being spaced out of contact with the lower surface of the main leaf spring under normal load conditions, and connecting means for connecting the central sections of said springs to the axle of said vehicle, said connecting means comprising an axle mounting bracket, a resilient compressible jacket enclosing the central section of said main spring, a channel member surrounding said jacket and having a web portion and a pair of side flanges extending outwardly from said web portion, the ends of said flanges contacting the upper surface of said secondary leaf spring to thereby limit the compression of said jacket, and clamping means for clamping said channel member to said mounting bracket, and the application of a predetermined heavy load to said main leaf spring causing said main leaf spring to be deflected downwardly into engagement with said pads to thereby enable said secondary leaf spring to carry a portion of said heavy load.

2. The leaf spring of claim 1, wherein said secondary leaf spring is composed of steel.

3. The leaf spring construction of claim 1, wherein each end of the secondary leaf spring is provided with a hole and each pad is provided with a projection that is snap fitted within the respective hole.

4. A dual rate leaf spring comprising a generally upwardly curved main leaf spring having a central section disposed to be connected to an axle of a vehicle and having a pair of ends disposed to be connected to a frame of said vehicle, said main spring being composed of a single leaf of fiber reinforced thermosetting resin, a secondary leaf spring disposed beneath the main leaf spring and having a substantially shorter length than the main leaf spring, said secondary spring having a central portion and a pair of end portions extending downwardly and outwardly from said central portion, an elastomeric pad mounted on each end of the secondary leaf spring and having an upwardly projecting head, each head having a generally rounded configuration in vertical cross section and each head being spaced out of contact with the lower surface of the main leaf spring under normal load conditions, and clamping means for clamping the main leaf spring and the secondary leaf spring to said axle, said clamping means including means for spacing said secondary leaf spring from said main leaf spring whereby said secondary spring is spaced out of contact with said main spring throughout its length, the application of a predetermined heavy load to the main leaf spring causing the main leaf spring to be deflected downwardly into engagement with said pads to thereby enable said secondary leaf spring to carry a portion of said load.

5. A dual rate leaf spring comprising a generally upwardly curved main leaf spring having a mounting section disposed to be connected to a vehicle and having a pair of ends, said main spring being composed of a single leaf of fiber reinforced thermosetting resin, a secondary leaf spring disposed beneath the main leaf spring and having a substantially shorter length than the main leaf spring, said secondary spring having a central portion and a pair of end portions extending outwardly from said central portion, an elastomeric pad mounted on each end of the secondary leaf spring and having an upwardly projecting head, each head being spaced out of contact with the lower surface of the main leaf spring under normal load conditions, and clamping means for clamping the main leaf spring and the secondary leaf spring to said vehicle, said clamping means including means for spacing said secondary leaf spring from said main leaf spring whereby said secondary leaf spring is spaced out of contact with said main spring throughout its length, the application of a predetermined heavy load to the main leaf spring causing the main leaf spring to be deflected downwardly into engagement with said pads to thereby enable said secondary leaf spring to carry a portion of said load, each pad being configured to provide a relatively large area of contact between said pad and said main leaf spring under said heavy load.

* * * * *